March 20, 1962  J. D. ROBINSON ET AL  3,026,228
LAMINATED ARTICLES REINFORCED WITH GLASS FIBERS
Filed June 12, 1957

INVENTORS
Jack D. Robinson
Anthony J. Urbanic
BY
ATTORNEYS 3,026,228
LAMINATED ARTICLES REINFORCED WITH GLASS FIBERS Jack D. Robinson, Wadsworth, and Anthony J. Urbanic, Akron, Ohio, assignors to The General Tire & Rubber Company, Akron, Ohio, a corporation of Ohio
Filed June 12, 1957, Ser. No. 665,277
3 Claims. (Cl. 156—309)

This invention relates to laminated articles reinforced by fiber glass and to a method of making them.

Building up shaped articles from one or more layers of fibrous material and adhering the fibers together by a thermosetting resinous material such as a polyester-styrene resin, epoxy resin, phenolic resin, or the like, solidified in situ from a liquid is a well known process. Generally, the glass fiber mat or flock preforms are impregnated with a liquid resin such as an unsaturated solidifiable liquid polymerized in situ under heat and pressure to produce a shaped product. In the past it has been difficult to obtain a smooth surface which will receive paint or varnish and provide a smooth, glossly polished or piano-type finish. The surfaces in general have been rough, or pitted, or show ridges where glass fibers reach the surface.

Attempts have been made to provide a smooth surface by sanding but the fibers tend to stand up more and tend to tear out of the layer making the surface unsightly.

It is an object of the present invention to form a smooth surface on polyester, fiber glass laminated articles, particularly when they are molded under conditions of heat and pressure.

A further object is to provide a surface that does not have the glass fiber pattern visible, which is often objectionable.

Another object is to provide a method of forming a smooth paintable surface on a fiber glass reinforced resinous article which is relatively free of surface defects.

Figure 1:
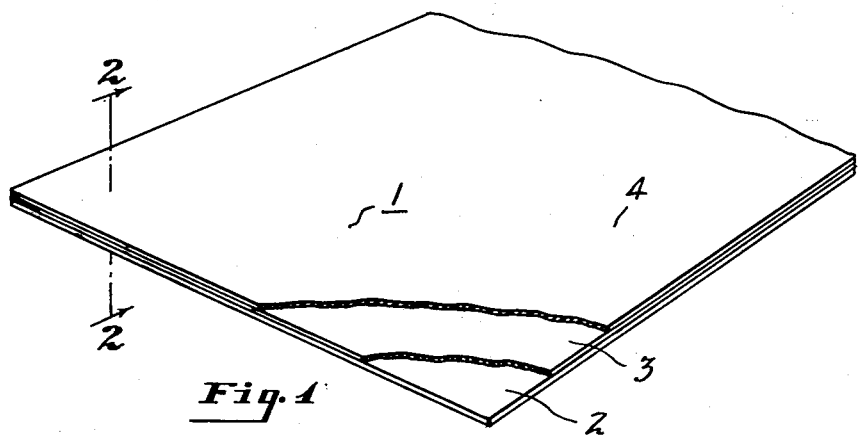
Figure 2:
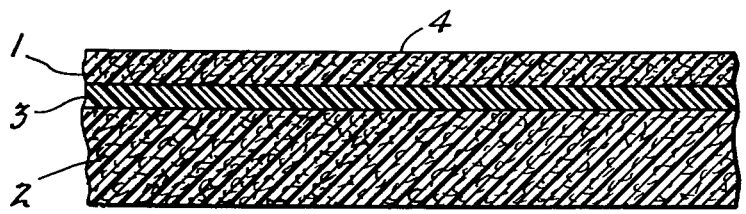

These and other objects will become apparent to those skilled in the art from the following description, the appended claims, and the drawings in which:

FIGURE 1 is a fragmentary perspective view of a laminated fiberglass reinforced in situ solidified resinous article embodying the present invention; and FIGURE 2 is a fragmentary sectional view taken on the line indicated at line 2—2 in FIGURE 1, and on an enlarged scale.

Referring to the drawing, FIGS. 1 and 2 show a relatively thin top layer 1 made of an in situ solidified resin such as polyester reinforced with glass fibers, a relatively thick bottom layer 2 composed of an in situ solidified resin such, for example, as a polyester resin reinforced with glass fibers, and an intermediate layer 3 of a presolidified thermoplastic solid composition such, for example, as a sheet or layer of polystyrene which has a high impact resistance and is compatible with the polyester or resin used to bind the fibers together.

The thermoplastic composition even though it is not on the outside of the article surprisingly causes the fibers of the outer layer of fibrous material and resin to disappear from view so that a dense, smooth, paintable surface 4 results. While it would seem that the nonfibrous thermoplastic resinous sheet should advantageously be applied on the outside of all the fibrous layers to provide such a smooth surface, we have found that such positioning provides a greatly inferior result apparently because of buckling and folds in the sheetlike thermoplastic layer. In addition, the desired hardness and thermosetting properties are not obtained on the outer surface. On the other hand, when the outer layer of fiber and polymerizable liquid resin is placed over an inner layer of compatible thermoplastic polymer and the liquid resin polymerized to the solid thermoset state with the aid of heat sufficient to soften said thermoplastic layer, a smooth and blemish-free polyester or thermoset resin surface is provided. This smooth surface has all the advantages of reinforced thermoset resin or polyester resin material such as great strength as well as excellent impact-resistance, scratch resistance, and corrosion resistance. The intermediate layer 3 is of a thermoplastic polymer of a mono-olefinic compound which is preferably compounded to provide high impact resistance and which is compatible with the resin bonding the fibers together. The intermediate layer 3 preferably is a polyvinyl aromatic resin such as polystyrene plasticized or compounded to give it greater impact resistance by a compatible rubbery plasticizer such as a copolymer of a diolefin and styrene. The rubbery plasticizer is preferably used in amounts of about 5 to 30% by weight of a rubbery material such as GR-S rubber which produces excellent results.

When polyester-styrene laminating resins are used, polystyrene is preferably present in amounts of 70 to 95% by weight in order to obtain the desired compatibility with the polyester of the top and bottom layer. Best results are obtained when the polystyrene is present in amounts of about 80 to 90% by weight.

Other solid polymers of mono-olefinic compounds such as polymethylmethacrylate and polymers of nuclear substituted styrenes such as polymers 3,5-dimethyl styrene, polyethylene and polyvinyl chloride may be used in place of the polystyrene or thermoplastic high impact resistant resinous material above described when the solidified resin is selected to be compatible therewith. Acrylic and methacrylic acid esters, and particularly polymethacrylate, in sheet form, are especially desirable for use in forming the intermediate layer when a polyester-methylmethacrylate, or polyester-acrylic acid or nitrile resin is used for laminating.

As mentioned before the styrene polymer, which is brittle, preferably is plasticized with GR-S rubber or other compatible rubbers, such as a low nitrile-styrene rubber to reduce its fragility and increase its impact resistance.

When a polyester-methylmethacrylate or other polyester-olefin laminating resin is used to form a polyester layer, the intermediate thermoplastic layer may be formed of predominantly polyvinyl chloride composition since polyvinyl chloride is more compatible with the above mentioned polyester olefin resins. A suitable polyvinyl chloride composition which is highly shock-resistant is one that contains about 40 to 70% by weight of polyvinyl chloride, about 14 to 53% by weight of a high styrene containing resinous copolymer, and about 7 to 16% by weight of a highly polar rubber such as a butadiene-acrylonitrile copolymer or a butadiene-methyl isopropenyl ketone copolymer. The resinous copolymer preferably contains about 60 to 85% by weight of styrene or a styrene derivative, such as a nuclearly substituted styrene or alpha methyl styrene. When a polyvinyl chloride composition or other thermoplastic composition is used in the intermediate layer the bond between the intermediate layer and the polyester-glass fiber layers is sometimes weaker and is improved by an epoxy type cement for suitable bonding such as a cement containing at least about 5 up to 30% by weight of a condensation product of epichlorohydrin and bisphenol-A.

The thickness of the impact-resistant intermediate layer 3 may be as low as about 10 mils and still provide a bond between the polyester layers and still absorb irregularities of the polyester layers so as to form a smooth outer surface. The preferred thickness of the intermediate layer is about 15 to 25 mils although thicknesses as high as 30 to 35 mils may be used.

Still another function of the intermediate layer is the definite improvement in water resistance of the laminated article since the intermediate layer tends to break up the tendency for capillary or wicking action of the fibers in the polyester layers.

The top layer 1 has a smooth outer surface 4 which has all the advantages of reinforced polyester materials such as chemical and moisture resistance, scratch resistance, impact resistance, dimensional stability and great strength.

The preferred polyester resins are adapted to molding at low pressures which are generally about 20 to 60 pounds per square inch, and at low temperatures which are generally about 180 to 280° F. and preferably 200 to 260° F. The molding temperature should for best results be above the softening point of the thermoplastic layer. The polyesters suitable in the present invention are unsaturated and cure by means of the double bond and do not cure by condensation and the accompanying liberation of water as do phenolic resins. As a consequence, the polyester resins do not require high pressure in the molding and laminating operations as do the phenolic resins, which is a definite advantage in many applications.

Since the liquid polyester resins readily absorb air or other gases, the polyester is preferably used to impregnate the glass fiber mat of the top layer by a solvent system which effectively degasses the polyester upon evaporation of the solvent. The polyester also may be degassed by subjecting it to a vacuum amounting to a pressure of only about 1 to 5 millimeters of mercury or even less to remove any dissolved gases or air.

Suitable unsaturated polyesters may be formed by reacting a glycol or bifunctional polyol of the general formula $HO-(RO)_n-H$ in which $n$ is an integer of 1 to 50 and R is a hydrocarbon and preferably a divalent alkylene group such as methylene, ethylene, and propylene with an unsaturated polycarboxylic acid such as maleic and fumaric acid or mixture of such unsaturated acid with saturated dicarboxylic acid as is well known in the art. The unsaturated polyester also may be formed by reacting a dicarboxylic acid such as terephthalic and isophthalic acids having no aliphatic unsaturation with an unsaturated alcohol such as allyl alcohol. The polyesters formed by reaction of a glycol with isophthalic or terephthalic acid mixed with maleic or fumaric acids are particularly effective in reducing surface blemishes on the surface 4 when it is used to impregnate the fiber glass mats from a solvent system.

As is well known in the art, unsaturated polyesters are formed by reacting polyglycols with the polycarboxylic acids with loss of water until the desired viscosity is obtained. The polyesters thus formed are usually mixed with polymerizable olefinic compounds such as styrene, methyl methacrylate, diallyl phthalate, etc. and the mixture cured in contact with reinforcing glass fibers, etc. by catalysts such as a free radical producing catalyst of which benzoyl peroxide, dicumyl peroxide, and cumene hydroperoxide are examples. The weight of the reinforced glass fibers is usually about 20 to 70% by weight of the total layer and the fiber distribution in the layer preferably is as uniform as possible to eliminate a bumpy surface. Very good results have been obtained with glass fiber mats as available on the market or by blowing staple fibers on a screen through which air is removed. The glass fiber mats are characterized by random arrangement of chopped fibers. Generally the thickness of the top layer 1 is about 10 to 35 mils.

In place of fiber glass mats, felted and interwoven materials which are characterized by random arrangement of various fibers may be used. Suitable fibers are cotton, rayon and other synthetic fibers. However, the substitution of such fibers for glass fibers greatly decreases the strength and resistance of the article to water and weather.

The bottom or base layer 2 of the laminate is generally thicker than the intermediate or top layer 1 and is composed of an unsaturated polyester resin or mixture of such resin with mono-olefine or a material having conjugated double bonds or a diallyl phthalate reinforced by glass fibers as more fully described in the description of the top layer. The following example is intended to illustrate the invention and not to limit it in any way:

*Example 1*

The top layer of a laminated article is formed by saturating a 20 mil glass fiber mat with a free radical catalyzed viscous polyester resin-styrene mixture. The polyester is prepared by esterifying a mixture of about 0.5 mole of fumaric acid and about 0.5 mole of isophthalic acid with about one mole of ethylene glycol. The saturated glass fiber mat is placed on the bottom plate of a matched metal mold. An intermediate layer of a 15 mil sheet of polystyrene plasticized with 15% GR–S rubber is placed on the saturated glass fiber top sheet. A bottom layer (formed by 3 plies of 3 ounce per square foot glass fiber reinforcing mat to which 150 grams of catalyzed polyester resin has been added) is applied over the intermediate layer. The top plate of the mold is placed over the bottom layer to form a 3-ply laminate and thereafter the entire assembly is molded for 5 minutes at 250° F. at 40 pounds per square inch.

The resulting laminate article had a smooth top surface which was relatively free of surface blemishes, such as pin holes or cracks. The surface was hard and had good impact resistance, and was found to be relatively unscratchable.

While polyester resins are generally preferred in making fiber or glass reinforced articles of the present invention, other in situ solidifiable thermo-setting resins in the above example may be substituted therefor. Thus the polyester resin may be substituted by liquid heat solidifiable phenol formaldehyde resins, the various epon resins etc. to also give improved surface finish. When phenolic resins are used for bonding fibers together, a polymethacrylate sheet or a sheet of styrene-acrylonitrile resin plasticized with nitrile rubber such as Royalite is preferred in place of the polystyrene sheet.

The process of the present invention can be used to make molded reinforced plastic laminated articles for vehicle bodies, chair backs and the like.

It is to be understood that in accordance with the provisions of the patent statutes, the particular form of product shown and described and the particular procedure set forth are presented for purposes of explanation and illustration and that various modifications of said product and procedure can be made without departing from our invention.

What we claim is:

1. A method of forming a glass-fiber-reinforced laminated article having a smooth hard dense outer surface free of surface blemishes comprising (A) assembling (1) a relatively thin first layer of glass-fiber material impregnated with a liquid thermosetting polyester resin, (2) a relatively thin intermediate second layer of a presolidified thermoplastic resin having one side thereof in contact with said first layer and having a thickness of about 10 to 35 mils, and (3) a relatively thick third layer of a fibrous material impregnated with a liquid thermosetting resin in contact with the other side of said second layer to form an assembly, and (B) thereafter molding said assembly under heat and pressure to soften said thermoplastic layer while simultaneously solidifying said liquid thermosetting resins and causing said first layer to conform to the shape of a smooth mold surface, said heat and pressure uniting said first second and third layers, said thermoplastic resin being miscible with said thermosetting resins.

2. A method of forming a fiber-reinforced laminated article having a smooth hard outer surface comprising (A) assembling (1) a first layer of a fibrous material impregnated with a liquid thermosetting resin, said layer comprising a relatively thin glass-fiber mat, (2) an intermediate second layer of a presolidified thermoplastic resin in contact with said first layer, said second layer having a thickness of at least 10 mils, and (3) a third layer of a fibrous material impregnated with a liquid thermosetting resin in contact with said second layer to form an assembly, said third layer being a relatively thick glass-fiber mat, and (B) molding said assembly at a temperature of about 180° to 280° F. and a pressure of about 20 to 60 pounds per square inch to solidify said liquid thermosetting resins and to unite the three layers while simultaneously causing said first layer to conform to the shape of a smooth surface, said thermoplastic resin being miscible with said thermosetting resins and being softened during said molding, the amount of glass fibers in each of said first and third layers being about 20 to 70 percent by weight of the thermosetting resin and glass fibers of each of said first and third layers.

3. A method of forming a fiber-reinforced laminated article having a smooth hard outer surface comprising (A) assembling (1) a first layer comprising a relatively thin glass-fiber mat saturated with a thermosetting resin comprising an unsaturated polyester and a copolymerizable liquid olefinic compound, (2) an intermediate second layer of a presolidified thermoplastic resin in contact with said first layer, said second layer having a thickness of at least 10 mils, said thermoplastic resin being an impact-resistant composition which comprises about 70 to 95 percent by weight of polystyrene, and (3) a third layer in contact with said second layer to form an assembly, said third layer being a relatively thick glass-fiber mat saturated with a thermosetting resin comprising an unsaturated polyester and a copolymerizable liquid olefinic compound, and (B) molding said assembly at a temperature of about 180 to 280° F. and a pressure of about 20 to 60 pounds per square inch to solidify said thermosetting resins and to unite said layers while causing said first layer to conform to the shape of a smooth surface, said thermoplastic resin being miscible with said thermosetting resins and being softened during said molding.

References Cited in the file of this patent
UNITED STATES PATENTS

| | | |
|---|---|---|
| 2,123,155 | Groff | July 5, 1938 |
| 2,311,613 | Slayter | Feb. 16, 1943 |
| 2,562,951 | Rose et al. | Aug. 7, 1951 |
| 2,613,397 | Borkland | Oct. 14, 1952 |
| 2,688,580 | Fingerhut | Sept. 7, 1954 |
| 2,805,181 | Groff et al. | Sept. 3, 1957 |
| 2,861,910 | Johnson et al. | Nov. 25, 1958 |